3,328,118
METHOD FOR THE MANUFACTURE OF ALKALI
METAL ORTHOPHOSPHATES
Makoto Sasakura, Onoda, Japan, assignor to Onoda
Cement Company, Limited, Onoda, Japan
No Drawing. Filed July 1, 1963, Ser. No. 292,116
Claims priority, application Japan, July 12, 1962,
37/28,736, 37/28,737
10 Claims. (Cl. 23—107)

This invention relates to a method for the manufacture of alkali metal orthophosphates by reacting together orthophosphoric acid, a compound selected from the group consisting of potassium chloride and sodium chloride and at least one aliphatic amine selected from a primary-, a secondary- and a tertiary-amine, forming a reaction mixture containing at least one crystalline alkali metal orthophosphate selected from the group consisting of dipotassium phosphate ($K_2HPO_4$), tri-potassium phosphate ($K_3PO_4$), mono-potassium phosphate ($KH_2PO_4$), di-sodium phosphate ($Na_2HPO_4$), tri-sodium phosphate ($Na_3PO_4$) and mono-sodium phosphate ($NaH_2PO_4$), and separating said orthophosphates from the reaction mixture.

Heretofore, there has been practiced a method for manufacting the alkali metal orthophosphates by using a neutralization reaction between orthophosphoric acid and an alkali substance selected from potassium hydroxide, sodium hydroxide, potassium carbonate, sodium carbonate, potassium bicarbonate and sodium bicarbonate. The method, however, has a disadvantage that the alkali substances are usually expensive as compared with potassium chloride and sodium chloride because they must be manufactured by the electrolysis of potassium chloride and sodium chloride or other chemical methods.

Also, there has been practiced a method for manufacturing an alkali metal phosphate by reacting orthophosphoric acid with alkali chloride at an elevated temperature at which hydrogen chloride gas is expelled. In such a method, the resulting alkali metal phosphate is substantially composed of meta-phosphate and pyrophosphate or the like. The alkali metal orthophosphates are scarcely obtained. In such a prior method, orthophosphoric acid must be used in excess of the stoichiometric amount required for chemical equilibrium in order to obtain the orthophosphates and the resulting product contains the alkali metal orthophosphate and free orthophosphoric acid.

It is, therefore, an object of this invention to provide an economical method for the manufacture of alkali metal orthophosphates in a highly pure and solid state by using inexpensive raw materials such as potassium chloride and sodium chloride, together with orthophosphoric acid. In this invention, impure orthophosphoric acid which is produced by a wet method for the manufacture thereof can be used successfully.

Another object of this invention is to provide an economical method for the manufacture of alkali metal orthophosphates in a highly pure and solid state by reacting together orthophosphoric acid, an alkali metal chloride and at least one aliphatic amine which is recycled into said reaction after it is regenerated.

Further another object of this invention is to provide an economical method for the manufacture of alkali metal orthophosphates in a highly pure and solid state by using a solvent to make it easy to crystallize the alkali metal orthophosphates from a reaction mixture containing a precipitate of said orthophosphates.

In accordance with the method of this invention, orthophosphoric acid, a compound selected from the group consisting of potassium chloride and sodium chloride and an aliphatic amine selected from primary, secondary and tertiary amines containing 1 to 5 carbon atoms, preferably 1 to 3, in each of the alkyl groups are reacted together thereby to form a reaction mixture containing an alkali metal orthophosphate or orthophosphates and a hydrochloride of the corresponding aliphatic amine as shown in the following chemical equations.

$$2KCl + H_3PO_4 + 2RNH_2 \rightarrow K_2HPO_4 + 2RNH_2 \cdot HCl$$
$$2NaCl + H_3PO_4 + 2RNH_2 \rightarrow Na_2HPO_4 + 2RNH_2 \cdot HCl$$
$$3KCl + H_3PO_4 + 3RNH_2 \rightarrow K_3PO_4 + 3RNH_2 \cdot HCl$$
$$3NaCl + H_3PO_4 + 3RNH_2 \rightarrow Na_3PO_4 + 3RNH_2 \cdot HCl$$
$$KCl + H_3PO_4 + RNH_2 \rightarrow KH_2PO_4 + RNH_2 \cdot HCl$$
$$NaCl + H_3PO_4 + RNH_2 \rightarrow NaH_2PO_4 + RNH_2 \cdot HCl$$

These alkali metal orthophosphates can be theoretically produced according to the chemical equations given above and crystallize according to the phase diagram as described in the book entitled "Phosphorus and its Compounds," vol. I, pp. 494–496, by Van Wazer and they can easily be separated from the resulting reaction mixture by the conventional methods such as filtration and the like.

The aliphatic amines used in this invention include a primary amine such as monoethanol amine, monoethyl amine, monopropyl amine, and monoisopropyl amine, a secondary amine such as diethyl amine, dimethyl amine, methyl-ethyl amine and diethanol amine, and a tertiary amine such as triethyl amine, trimethyl amine and methyl-ethyl-propyl amine, having one or more alkyl groups containing 1 to 5 carbon atoms, preferably 1 to 3, therein and they can be used in chemical equivalence although they are preferably used in an amount of 10 to 40 percent in excess of the amount theoretically required.

Also, in accordance with the method of this invention, at least one solvent selected from the group consisting of alcohols, ethers and ketones is effective for increasing the amount of the precipitate of the orthophosphates, which have rather high solubility, and for eliminating the amine salts adhered to the orthophosphates because these solvents usually reduce the solubility of the orthophosphates and, on the contrary, the amine salts are maintained in the state of solution. Such solvents used in this invention are the chemical compounds having a polarity and a boiling point suitable for a heat-treatment and they include alcohols such as methanol, ethanol, propyl alcohol, isopropyl alcohol, butanol, isobutanol, amyl alcohol, isoamyl alcohol, glycol, glycerol and cyclohexanol; ethers such as diethyl ether, di-n-propyl ether, isopropyl ether, di-n-butyl ether and di-isobutyl ether; and ketones such as acetone, methyl-ethyl ketone and diethyl ketone. And the amount of the solvents used in this invention varies depending on the characteristics of the alkali metal orthophosphates produced and also the concentration of orthophosphoric acid used in the reaction, but said solvents are usually used in an amount of from $\frac{1}{10}$ to 10 times the amount of the amines used.

In a practical embodiment of this invention, the amines may be added to a reaction mass in any step of the reaction but it is desired to use them in the last step of the reaction for saving their loss due to the increase of the reaction temperature.

The hydrochloride of aliphatic amine which is produced in the chemical equations given above can be converted into the corresponding aliphatic amine and hydrochloric acid or alkali earth chlorides by reacting with an alkaline substance such as calcium oxide, calcium hydroxide, magnesium oxide or magnesium hydroxide and the regenerated aliphatic amine can be separated by a suitable method, for example by a conventional steam distillation method and the regenerated amine can be recycled into the reaction for the manufacture of alkali metal orthophosphate in accordance with the method of this invention.

It is an advantage of this invention that the orthophosphates can be economically manufactured even if impure orthophosphoric acid which is produced by a wet manufacturing method therefor is used. Said impure orthophosphoric acid contains some impurities such as aluminium and iron compounds which produce colloidal impurities in the reaction mixture having pH value of 3 to 4 and they cause considerable difficulty in the filtration process. However, in this invention such a filtration difficulty is avoided by using the solvents mentioned above because said colloidal impurities are dehydrated by the action of the solvent and can easily be removed. In addition, it is further another advantage of this invention that the aliphatic amines are regenerated and recycled into the reaction of this invention and also the hydrochloride of alkyl amine adhered to the crystalline orthophosphates can be removed and recovered by washing it with the above-mentioned solvents such as alcohols, ethers and ketones.

The following examples are illustrative of the practice of this invention and are not intended to limit the invention.

*Example 1*

Orthophosphoric acid of 20 percent concentration calculated as phosphorous pentoxide ($P_2O_5$) was charged in an amount of 177.5 grams into a glass made vessel and 58.5 grams of sodium chloride were added thereto with agitation. Then the resulting mixture was mixed with 73.0 grams of diethyl-amine by maintaining at a temperature of 30° C. On the completion of the reaction, the reaction mixture was allowed to cool, and crystalline di-sodium phosphate dodecahydrate ($Na_2HPO_4 \cdot 12H_2O$) was obtained. The resulting phosphate was filtered off and thus was obtained 151.0 grams thereof. The filtrate was mixed with 40 grams of calcium hydroxide and the mixture was subjected to distillation, from which was recovered 72.0 grams of diethylamine.

*Example 2*

Orthophosphoric acid of 20 percent concentration calculated as phosphorous pentoxide ($P_2O_5$) was charged in an amount of 177.5 grams into a glass vessel and 74.6 grams of potassium chloride and 101.2 grams of triethylamine were added thereto with agitation. Then the resulting mixture was mixed with 300 grams of methanol and cooled to 0° C.

In this example, crystalline di-potassium phosphate hexahydrate ($K_2HPO_4 \cdot 6H_2O$) was filtered and washed with 50 grams of methanol. The resulting phosphate was filtered off and thus was obtained 138.4 grams thereof. The filtrate was mixed with the waste methanol solution and after the methanol was distilled from the mixture, 40.0 grams of calcium hydroxide were added to the mixture. Again, the mixture was subjected to distillation to recover 100.0 grams of triethylamine.

*Example 3*

200 grams of orthophosphoric acid having a 35 percent concentration calculated as phosphorous pentoxide ($P_2O_5$) were mixed with 75.0 grams of potassium chloride in a reaction vessel fitted with a stirrer. Then the resulting slurry was mixed with 65.0 grams of monoethanolamine by maintaining at a temperature of below 80° C. On the completion of the reaction, the reaction mixture was cooled to 10° C. to form crystalline monopotassium phosphate. The resulting phosphate was filtered off to obtain 120 grams. Said phosphate was washed with a small amount of methanol in order to recover the hydrochloride of monoethanolamine adhered to the phosphate. The waste methanol was mixed with the mother liquor to crystallize mono-potassium phosphate and then the resulting phosphate was separated by the filtrating method and the filtration was mixed with calcium hydroxide and the resulting mixture was subjected to distillation to remove mono-ethanolamine. In this example, mono-potassium phosphate was obtained with a yield of 95% and monoethanolamine recovered with a yield above 99.5%.

*Example 4*

355 grams of orthophosphoric acid having a 20 percent concentration calculated as phosphorous pentoxide ($P_2O_5$) were mixed with 117 grams of sodium chloride in a reaction vessel and then 220 grams of diethanolamine were added to the contents of the reaction vessel at a temperature of below 100° C. On the completion of the reaction, crystalline di-sodium phosphate dodecahydrate ($Na_2HPO_4 \cdot 12H_2O$) was filtered off to obtain 330 grams. The resulting phosphate and the filtrate were treated in the same manner as described in Example 3. In this example, di-sodium phosphate dodecahydrate was obtained with a yield of 98.2% and diethanolamine recovered with a yield of 99%.

*Example 5*

The method of Example 3 was repeated by employing 200 grams of orthophosphoric acid having a 35 percent concentration calculated as phosphorous pentoxide ($P_2O_5$), 75.0 grams of potassium chloride and 90 grams of a mixture of monoethanolamine and diethanolamine in molar proportions of 1/1. In this example, mono-potassium phosphate was obtained with a yield of 96% and the amines were recovered with a yield of 99%.

*Example 6*

355 grams of orthophosphoric acid having a 20 percent concentration calculated as phosphorous pentoxide ($P_2O_5$) were mixed 150 grams of sodium chloride to form a slurry mixture. Then the resulting slurry was mixed with 160 grams of monoethanolamine as in the case of Example 3. On the completion of the reaction, the reaction mixture was allowed to cool to form crystalline phosphates. The resulting phosphates was filtered off to obtain 350 grams. It was found by chemical analysis that the said phosphates were a mixture of di-sodium phosphate dodecahydrate ($Na_2HPO_4 \cdot 12H_2O$) and tri-sodium phosphate dodecahydrate ($Na_3PO_4 \cdot 12H_2O$) in the molar equivalent proportion. In this example, the di-sodium phosphate and the tri-sodium phosphate were obtained with a yield of 95.4% and monoethanolamine was recovered with a yield of 99%.

*Example 7*

237 grams of orthophosphoric acid having a 30 percent concentration calculated as phosphorous pentoxide ($P_2O_5$) were mixed with 58.5 grams of sodium chloride and 37.3 grams of potassium chloride to form a slurry mixture. Then the resulting slurry was mixed with 95 grams of monoethanolamine. On the completion of the reaction, the reaction mixture was allowed to cool to form crystalline phosphates. The resulting phosphates were filtered off to obtain 195 grams. It was found by chemical analysis that the phosphates were a mixture of 140 grams of di-sodium phosphate dodecahydrate $$(Na_2HPO_4 \cdot 12H_2O)$$

and 55.0 grams of mono-potassium phosphate ($KH_2PO_4$). In this example, amine was recovered with a yield of 98%.

*Example 8*

237 grams of orthophosphoric acid having a 30 percent concentration calculated as phosphorous pentoxide ($P_2O_5$) were mixed with 100 grams of potassium chloride to form a slurry mixture. Then the resulting slurry was mixed with 100 grams of monoethanolamine. On the completion of the reaction, the reaction mixture was allowed to cool to form crystalline phosphate. The resulting phosphate was mono-potassium phosphate and said phosphate was filtered off to obtain 90 grams. 350 grams of acetone were added to the filtrate separated from the mother liquor to form a secondary precipitate which was crystalline di-potassium phosphate. Also, this phosphate was separated with a weight of 58 grams. In this example, amine was recovered with a yield of 98%.

What I claim is:
1. A method for the manufacture of alkali metal orthophosphates comprising reacting together orthophosphoric acid, a compound selected from the group consisting of potassium chloride and sodium chloride and at least one aliphatic amine selected from the group consisting of primary, secondary and tertiary aliphatic amines containing 1 to 5 carbon atoms in each alkyl group, thereby forming a reaction mixture containing at least one alkali metal orthophosphate selected from the group consisting of di-potassium phosphate, tri-potassium phosphate, mono-potassium phosphate, di-sodium phosphate, tri-sodium phosphate and mono-sodium phosphate, and separating said alkali metal orthophosphate from the reaction mixture.

2. A method according to claim 1, wherein the aliphatic amine is selected from the group consisting of monoethyl amine, monopropyl amine, monoisopropyl amine, monoethanol amine, dimethyl amine, diethyl amine, methyl-ethyl amine, diethanol amine, trimethyl amine, triethyl amine and methyl-ethyl-propyl amine.

3. A method according to claim 1, wherein the amine is used in an amount of from the stoichiometrically required amount to 40 percent in excess of the stoichiometrically required amount.

4. A method according to claim 1, further comprising incorporating in the reaction mixture a solvent for hydrochloride salts of the amines, said salts being present in the reaction mixture said solvent being selected from the group consisting of alcohols, ethers and ketones.

5. A method according to claim 4, wherein the aliphatic amine is selected from the group consisting of monoethyl amine, monopropyl amine, monoisopropyl amine, monoethanol amine, dimethyl amine, diethyl amine, methyl-ethyl amine, diethanol amine, trimethyl amine, triethyl amine and methyl-ethyl-propyl amine.

6. A method according to claim 4, wherein the amine is used in an amount from the stoichiometrically required amount to 40 percent in excess of the stoichiometrically required amount.

7. A method according to claim 4, wherein the solvent is selected from the group consisting of methanol, ethanol, propyl alcohol, isopropyl alcohol, butanol, isobutanol, amyl alcohol, isoamyl alcohol, glycol, glycerol, cyclohexanol, diethyl ether, di-n-propyl ether, isopropyl ether, di-n-butyl ether, diisobutyl ether, acetone, methyl-ethyl ketone and diethyl ketone.

8. A method according to claim 4, wherein the solvent is used in an amount of from 0.1 to 10.0 times the amount of the aliphatic amine used.

9. A method according to claim 1, in which the alkali metal orthophosphates manufactured are sodium orthophosphates and the at least one alkali metal orthophosphate which the reaction mixture contains is selected from the group consisting of di-sodium phosphate, tri-sodium phosphate and mono-sodium phosphate.

10. A method according to claim 1, in which the alkali metal orthophosphates manufactured are potassium orthophosphates and the at least one alkali metal orthophosphate which the reaction mixture contains is selected from the group consisting of di-potassium phosphate, tri-potassium phosphate and mono-potassium phosphate.

References Cited
UNITED STATES PATENTS

| | | | |
|---|---|---|---|
| 1,805,873 | 5/1931 | Kaselitz | 23—107 |
| 1,929,443 | 10/1933 | Milligan | 23—107 |

OTHER REFERENCES

Richter: Textbook of Organic Chemistry, John Wiley and Sons, Inc., New York, 1938, p. 235.

OSCAR R. VERTIZ, *Primary Examiner.*

MILTON WEISSMAN, *Examiner.*

O. F. CRUTCHFIELD, *Assistant Examiner.*